Figure 1:
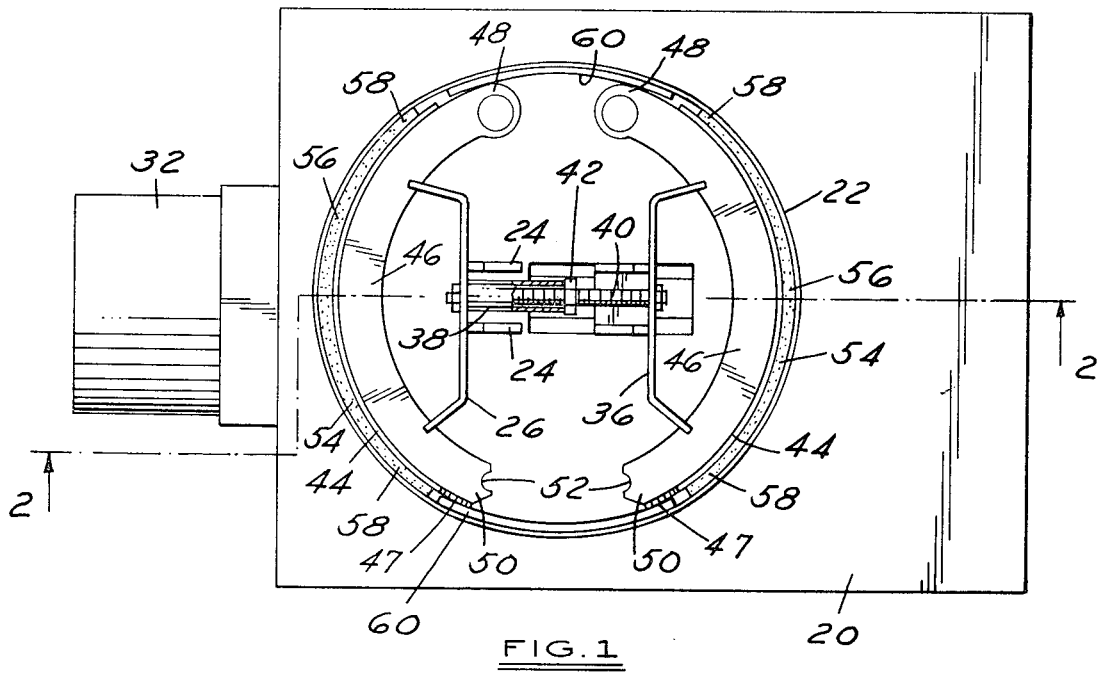

United States Patent

Morgan, Sr. et al.

[15] 3,638,560

[45] Feb. 1, 1972

[54] APPARATUS FOR BONDING BRAKE BLOCKS

[72] Inventors: Thomas E. Morgan, Sr.; Thomas E. Morgan, Jr., both of 4815 Bellevue, Detroit, Mich. 48207

[22] Filed: Dec. 29, 1969

[21] Appl. No.: 888,650

[52] U.S. Cl. ...................................100/93 PB, 269/321 B
[51] Int. Cl. .........................................................B02c 11/08
[58] Field of Search.................100/93 PB; 269/153, 130, 29, 269/321, 321 B; 29/233; 156/228

[56] References Cited

UNITED STATES PATENTS

| | | | |
|---|---|---|---|
| 2,444,191 | 6/1948 | Friberg | 269/321 B |
| 2,455,341 | 11/1948 | Saunders | 269/29 |
| 2,523,507 | 9/1950 | Langford et al. | 269/153 X |
| 2,616,479 | 11/1952 | Barrett | 269/321 B |
| 2,649,132 | 8/1953 | Barrett | 269/321 B |
| 2,807,306 | 9/1957 | Bigelow | 269/130 |
| 3,169,017 | 2/1965 | Tilden, Sr. et al. | 269/153 |

*Primary Examiner*—Peter Feldman
*Attorney*—Barnes, Kisselle, Raisch & Choate

[57] ABSTRACT

An apparatus for bonding brake blocks to brakeshoes and particularly that type of brake block which is used for large vehicles and has a changing radial dimension such that it is thicker at one end than the other. The concept includes a very high pressure system using a pressure band which encircles two opposed brakeshoes, these being separated by manually operated spreaders, there being an improved means for bridging the bands at the opposed ends of the brakeshoes to insure positive contact with, and uniform pressure on, the brake blocks in relation to the shoes during the bonding action, this means including relief holes in the band and a stress absorbing plate overlying the bridging portion to transmit force while eliminating destructive distortion and a strain absorber for lateral pressure distribution.

15 Claims, 10 Drawing Figures

INVENTORS
THOMAS E. MORGAN, SR.
THOMAS E. MORGAN, JR.
BY

Barnes, Kisselle, Raisch & Choate

ATTORNEY

INVENTORS
THOMAS E. MORGAN, SR.
THOMAS E. MORGAN, JR.
BY
Barnes, Kisselle, Raisch & Choate

ATTORNEY

INVENTORS
THOMAS E. MORGAN, SR.
THOMAS E. MORGAN, JR.
BY
Barnes, Kisselle, Raisch & Choate
ATTORNEYS

APPARATUS FOR BONDING BRAKE BLOCKS

This invention relates to an apparatus for bonding brake blocks to brakeshoes.

In the history of the art, many brake blocks, sometimes referred to as brake linings, have been riveted to the lining table of the brakeshoe which is mounted on a web or strut within the brakedrum of a wheel. It has been known also to utilize a bonding material for creating the adhesion between the brake lining and the brakeshoe table. This bonding is accomplished by putting a metal band tightly around the brakeshoes with the brake block or lining suitably positioned with an adhesive applied to the contacting surfaces. While under pressure, the parts are heated to obtain the proper bond.

With brake linings for passenger cars which are reasonably flexible and which in general have a uniform thickness from end to end, this system has been satisfactory. However, with larger brake units especially those used for trucks, buses and the like, the brake blocks have a much greater thickness and in addition in many cases this thickness varies intentionally from one section to the other, the thick portion being centrally of the shoes and the dimensions tapering off at the ends of the shoes.

The thickness and character of these brake blocks is such that they are quite rigid and it has been difficult to bond these blocks satisfactorily. On the other hand, riveted brake blocks for trucks have had many disadvantages. Trucks very frequently have to operate in conditions where the entire brake assembly is exposed to water, and rusting of the parts has occurred between the brake block and the brakeshoe lining table in such a way as to force the block away from the shoe. This may also happen only on one side of the brakeshoe which of course immediately creates an uneven pressure across the shoe, thus reducing the braking surface and effectiveness. In addition, the rivet wells will frequently accumulate abrasive material particularly in trucks carrying gravel, dirt, slag, and the like and this abrasive material will tend to score the brakedrums. Also, when the riveted brakeshoes wear down, the rivets themselves will tend to score the drums, all of this being an unsatisfactory condition.

It is an object of the present invention to disclose an apparatus for bonding the heavy brake shoes which are used on large commercial and military vehicles. This bonding has been accomplished by utilizing a much greater pressure than has ever been used before in the bonding field for brakeshoes, and the present invention has as its object the provision of an apparatus whereby it is possible to obtain a constant pressure around the band during the heating step to insure a large and consistent area of bond. With the higher pressures, it has been necessary also to avoid the distortion and flattening of the brakeshoe tables, that is, the plate on which the shoe is bonded and it is an object of the present invention to accomplish this bonding without destructive distortion. Thus, the bonded shoe avoids the problems of rust since there is no gap between the brakeshoe and the supporting table. It avoids the problems of the rivet wells in the brake material itself; it accommodates the brakeshoe to the table to compensate for any cupping or irregularities in the surfaces and the bonding actually strengthens the brakeshoe table because of the overall contact and adherence of the heavy brakeshoe material to the supporting plate, thus achieving what may be called lamination strength.

Another problem in connection with the bonding utilizing an encircling band to create the contact press$re has been the flattening of the ends of the band which tend to interfere then with the ends of the brakeshoe struts as they become chordal in shape.

The present invention contemplates providing clearance for the ends of the brakeshoe struts while also providing a reinforcement of the band at these areas to prevent undue stretching of the band under the heavy pressures that are required for the thick brake block linings.

Another feature of the invention is the utilization of removable pressure blocks which can contact the band through the entire width at the ends of the brake struts to create uniform pressure across the surface of the brake blocks during the pressure cycle.

Other objects and features of the invention will be apparent in the following description and claims taken with the drawings wherein there is set forth a preferred embodiment of the invention illustrating the principles of operation and the manner of use.

Drawings accompany the disclosure and the various views thereof may be briefly described as:

FIG. 1, a plan view of an assembly of the unit showing the face of the pressure table.

Figure 2:
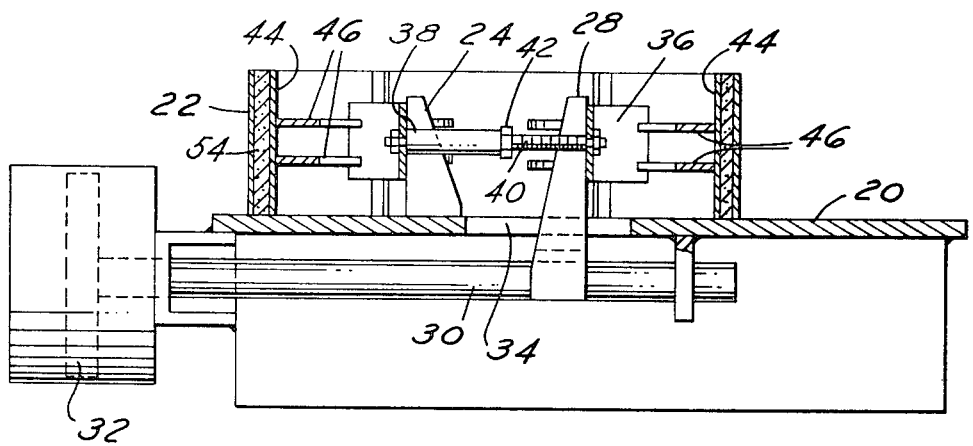

FIG. 2, a sectional view on line 2—2 of FIG. 1 illustrating the relationship of the parts.

Figure 3:
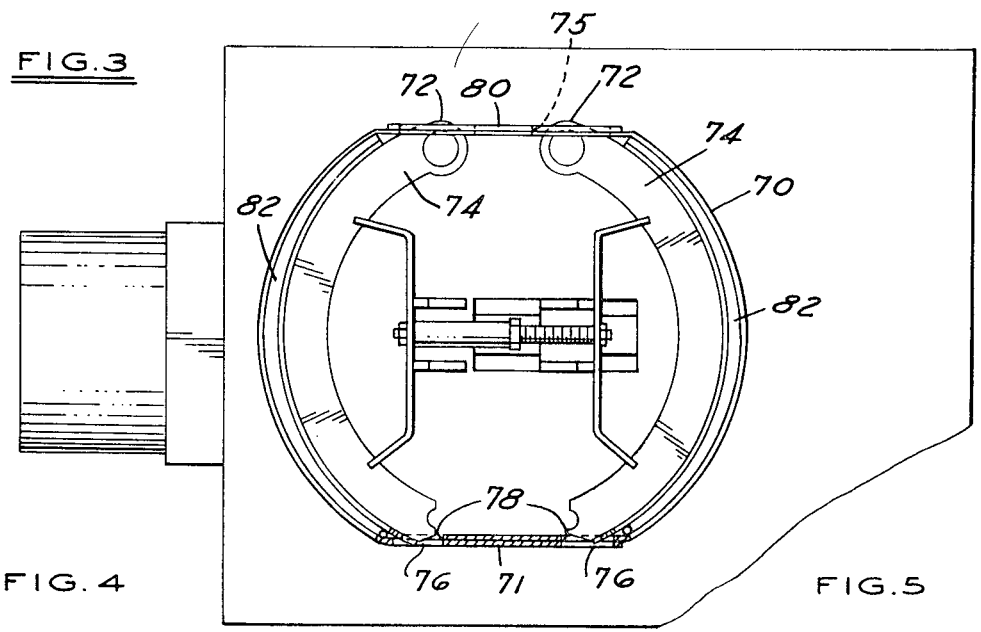

FIG. 3, a view similar to FIG. 1 showing the parts under stress of pressure and illustrating a modification of the pressure band.

Figure 4:
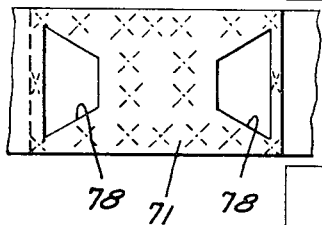

FIG. 4, a view of one side of the pressure band illustrating a cutout spanning portion.

Figure 5:
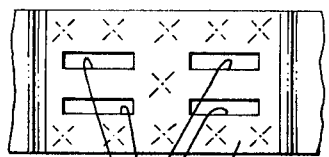

FIG. 5, a view of an opposite side of the pressure band illustrating a cutout spanning portion.

Figure 6:
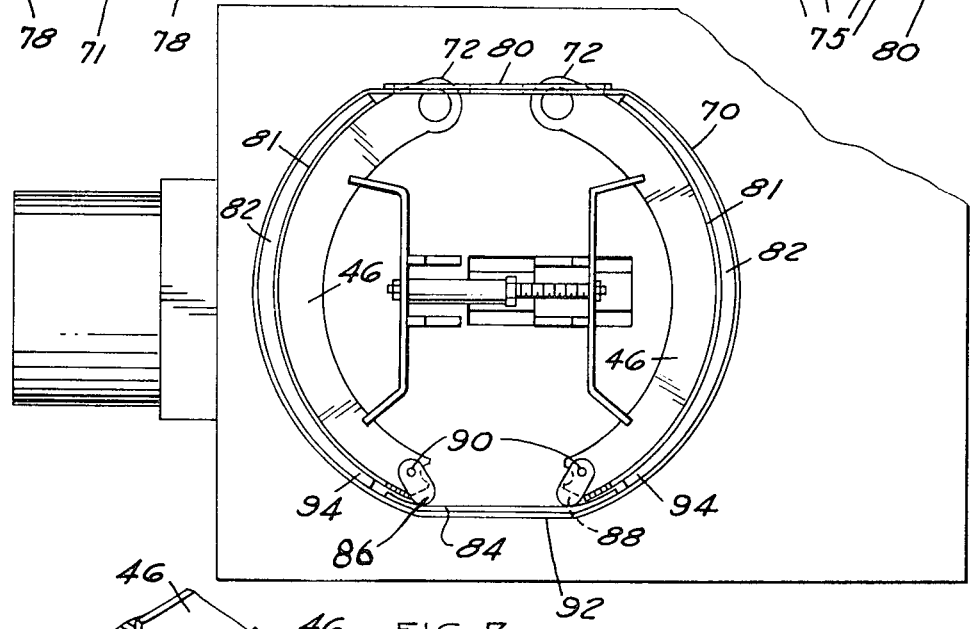

FIG. 6, a view of a modified clearance and pressure distribution apparatus.

Figure 7:
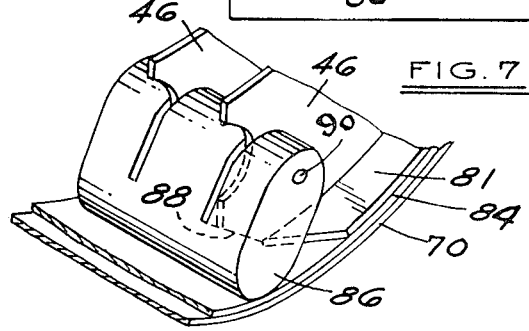

FIG. 7, an enlarged view showing a deflector block applied to the brakeshoe.

Figure 8:
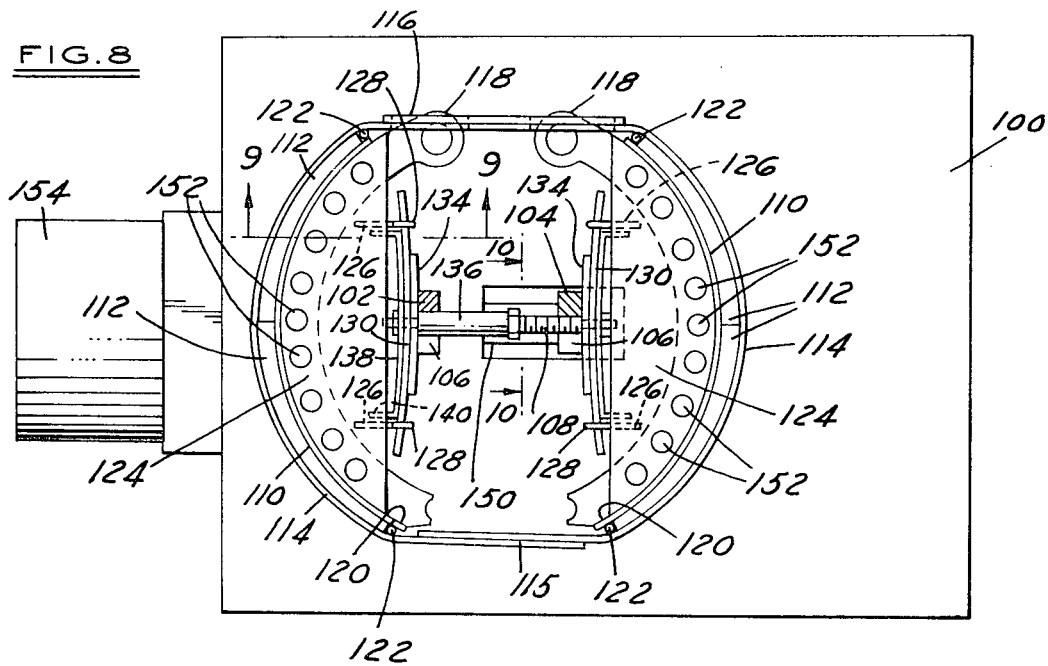

FIG. 8, a view of a modified pressure application apparatus and reinforcing band assembly.

Figure 9:
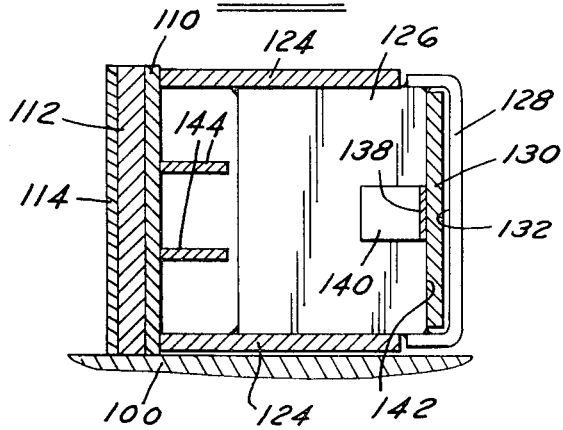

FIG. 9, a sectional view on line 9—9 of FIG. 8.

Figure 10:
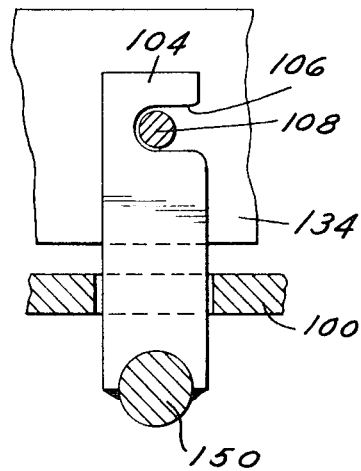

FIG. 10, a sectional view on line 10—10 of FIG. 8.

REFERRING TO THE DRAWINGS

In FIG. 1, a platform 20 is provided for assembly of the pressure rings 22, this table having a stationary upstanding bifurcate brace 24 which can bear against a left-hand pressure or spreader bracket 26. A movable bifurcate foot 28 mounted on a piston rod 30 of a piston cylinder assembly 32 extends through an opening 34 in platform 20 which permits it to bear against a spreader bracket 36.

The brackets 26 and 36 are connected by a screw and nut arrangement which passes between the bifurcate portions of the brace 24 and the foot 28. A hollow tube 38 bears against the cross portion of the bracket 26 and a threaded shaft 40 extends from bracket 36 into the tube. A nut 42 bears against the end of the tube 38. Accordingly, when the piston cylinder combination 32 is pressurized, the foot portion 28 will urge the bracket 36 away from the bracket 24 and when a final tension position is reached, the screw 32 is turned up against the end of the tube 38 to hold the parts in tension.

The brakeshoe comprises what is called an arcuate table portion 44 on the inner side of which are spaced struts or web pieces 46, these pieces having a pivot end 48 apertured to receive a pivot within the brake drum and a pressure end 50 having a semicircular recess 52 for receiving the pressure elements of a brake cylinder. On the brake tables 44, as shown in FIG. 1, is mounted a brake block or lining member 54.

It will be noted that this lining member is tapered from a thick central portion 56 to thinner end portions 58. Outside the entire assembly is an encircling metal band or pressure ring 22, previously referred to. This band is preferably formed of stainless steel and may have a thickness ranging from 0.050 to 0.090 inch. Within the band at the upper and lower ends is a reinforcement plate 60 which, for example, can be formed of 1010 carbon steel approximately three-sixteenths to one-fourth inch thick. It will be noted that this plate is positioned in such a way that it will contact the ends of the struts 46 and thus protect the band against localized pressure by contact with these struts or the beveled end 47 of the shoe table 44. As the pressure is applied by the power cylinder, the portions adjacent the ends 48 and 50 will tend to straighten out, and in the absence of these reinforcing plates, the band 22 would be distorted centrally and stretched at the sides and thus damaged by the concentrated pressure of the ends of the struts or the shoe table. In addition, the pressure laterally across the brakeshoe would become uneven and destroy the uniformity required for satisfactory results. The pressures in the expanding cylinders may range from 40,000 to 60,000 pounds resulting in a band pressure of about 200,000 pounds per square inch.

In FIG. 3, a modified system is shown wherein the encircling bands 70, overlapped in a welded joint 71, are provided with openings which permit the ends 72 of struts 74 to project through the band at openings 75 and similarly, at the bottom, the ends 76 project through the openings 78. The encircling band 70 is reinforced by a plate 80 at the top, this plate being also apertured and extending to a point circumferentially on each side of the chordal section approaching the ends of the brake tables 81 and the brake blocks or linings 82 which taper in dimension from the center to each end. With these heavy brake blocks, the pressure may be applied as high as 300 pounds per square inch with 50,000 to 60,000 pounds hydraulic pressure at the cylinders. Thus, pressure of the encircling band on the ends of the supporting struts 74 of the brakeshoes might tend to distort the shoes during the bonding cycle, and this pressure is relieved by the opening 78 but the band is reinforced by the double thickness in the welded overlap at this point to prevent undue stretching so that uniformity of pressure can be achieved longitudinally and laterally throughout each brake block.

In FIG. 6, a modified construction is shown wherein at the upper portion of the figure the same construction is shown as in FIG. 3 but at the bottom portion an inside plate 84 is provided to reinforce the band and pressure blocks 86 are provided having slots to receive the struts 46, these slots having a flat base to position against the flat ends 88 of the struts and being held in position by a pin 90 passing through the struts. Thus, the inside pressure plate 84, FIG. 7, bears against the rounded end of the blocks 86 to prevent contact with the tapered ends of the shoe tables and the ends of the struts and also to space the chordal portion 92 away from these ends so that there is a uniform transverse pressure across the band and on the brake block as it is pressed against the shoe.

Because of the high pressure used, it is desirable to provide a spreader bracket which is especially designed to distribute pressure on the table plate itself of the brakeshoe assembly while maintaining a means for compensating for what is called followup in the furnace heat. This means that when the furnace heat of approximately 500° to 600° is applied to the tensioned assembly to obtain a bonding temperature at the bond line of approximately 390° to 435° F., the metal band will expand somewhat. It is desirable to have a spring element in the unit which takes up such slack as may result from this expansion.

In FIG. 8, a modified structure is shown for heavy duty jobs wherein the expander table 100 has expander units 102 and 104, the unit 102 being stationary and the unit 104 being movable. These units are notched as shown at 106 to permit the spreader screw 108 to slide into place. The brakeshoe tables 110 carry the bands 112 which taper from the center outwardly toward the ends, these bands being sometimes in two pieces, and surrounding the entire assembly is the metal band 114 overlapped and welded together at the bottom 115. This band is reinforced at the top by a plate 116 welded thereto, both the band and the plate being apertured to permit the pivot ends 118 of the brakeshoes to project therethrough. At the bottom end of the drawing, it will be seen that the brake tables 110 are tapered at the ends 120 (as in FIG. 7) and a small transversely extending rod 122 is interposed so that pressures at this point on the band will extend completely across the band transversely. A similar rod 122 can be used at the top ends.

The spreader assemblies each comprise a pair of circular segment plates 124, each welded to spacer plates 126 which extend outwardly beyond the chordal edges of the plates 124 and terminate in a loop formed by a U-shaped rod 128 (see FIG. 9). A segment of a curved piece of spring steel 130 has its ends passing through the respective loops 132 and this plate is backed up by a second spring plate 134. The tube 136 of the spreader assembly is fastened through the center of these springs and on the inside of the springs is a positioner plate 138 having ends 140 to abut against the spacer plates 126. These positioner plates simply keep the springs from sliding out of the loops 132 in which they are loosely positioned to permit lateral movement. The springs bear directly against the outside edges of the spacer plates 126 and 142. On the right-hand assembly, the screw 108 is suitably secured to the spring leaves. The spacer plates 126, of course, have to be slotted out to receive brakeshoe struts 144.

Thus, as the assembly is viewed in FIG. 8, it will be seen that hydraulic pressure applied to the movable spreader upright 104 through the piston actuated rod 150 will put pressure against the two spring plate assemblies and pressure will be exerted through the spacer plates 126 to the circular segments 124 which have edges that bear directly against the brakeshoe tables 110. The circular edges of the pressure plates are apertured at 152 around the periphery to permit the passage of air to assure even distribution of heat in the oven.

It will be seen that the entire brakeshoe table is thus reinforced, not only by the struts 144, but also by the circular edges of the spreader plates 124, so that there is no opportunity for cupping and the proper curvature of the plate is maintained throughout the heating cycle. The bands are protected by the cross pins 122 at each end and the reinforcing plate 116 at the other end prevents any distortion or stretching of the band 114 where it is perforated. The cylinder 154, shown at the left-hand end of FIG. 8, drives the rod 150 (FIG. 10) in the same manner as shown in FIG. 2. Pressure is generally applied to the spring leaves 130, 134 until they are moved from their curved position to approximately a straight position, the loops 132 of U-shaped rods 128 permitting longitudinal adjustment. Then when the assembly is placed in the high heat of the oven, the springs will retain tension to take up for any expanding of the outer band 114 due to the change of temperature.

It should be appreciated that the apparatus herein described is particularly adapted for use on large brakeshoe tables which may have a spread of 6 to 8 inches or more and a circumferential length from 14 to 20 inches. Standard bonding material for heat setting is used. The brakeshoes themselves vary from one-half to more than 1 inch in thickness. Thus, the large pressures above described are necessary to achieve proper bonding contact and the apparatus described insures uniform application of that pressure while preventing distortion or destruction of the parts.

We claim:

1. A pressure band and spreader assembly for use in heat bonding brake blocks for large vehicle brakes utilizing brake blocks having a nonuniform thickness under pressures ranging from 200 to 300 pounds per square inch which comprises:
    a. a pressure band to encircle a pair of brakeshoes arranged circularly and loaded with brake blocks having a nonuniform radial dimension to be welded thereto,
    b. a portable spreader assembly to exert linear pressure diametrically against said brakeshoes to hold said shoes and said blocks against the inner walls of said band, and
    c. means carried by said assembly for transmitting localized press$re at the ends of said shoes transversely across the width of the pressure band to eliminate uneven stretching of said band.

2. A pressure band and spreader assembly as defined in claim 1 in which said means comprises a reinforcing plate means secured to said band to reinforce the band at its circumference which spans the space between the ends of said shoes.

3. A pressure band and spreader assembly as defined in claim 1 in which said means comprises a thickened portion derived from an overlap of the ends of said band to reinforce the band at its circumference which spans the space between the ends of said shoes.

4. A pressure band and spreader assembly as defined in claim 1 in which said means comprises a load bearing surface extending transversely of said band and positioned against circumferential displacement by engagement between said band and portion of a brakeshoe.

5. A pressure band and spreader assembly as defined in claim 1 in which said portable spreader mechanism comprises a pair of spaced pressure plates having arcuate surfaces to lie against laterally spaced portions of a brakeshoe on the outsides of struts on said shoes, and means to position said plates in said transverse spaced relation.

6. A pressure band and spreader assembly as defined in claim 5 in which spring leaf means is located to exert a radially outward force on said pressure plates, and means is provided to load said springs to provide a take up as compensation for band expansion under heat to maintain binding pressure on said brake blocks.

7. A pressure band and spreader assembly as defined in claim 5 in which the means to position said pressure plates comprises spacer plates extending between and secured to said pressure plates having transverse parallel edges extending away from the arcuate surfaces, leaf spring means spanning and overlying said edges, and means to exert radially outward pressure on said leaf spring means between said spacer plates to exert a high pressure radially on said spacer plates against the confined brakeshoes.

8. A pressure band and spreader assembly as defined in claim 5 in which means is provided at the edges of said spacer plates to loosely confine said leaf springs against displacement when said portable assembly is disassembled.

9. A pressure band and spreader assembly for use in heat bonding brake blocks for large vehicle brakes utilizing tapering brake blocks under pressures ranging from 200 to 300 pounds per square inch and having brakeshoe struts extending beyond brake block supporting tables which comprises:
  a. a pressure band for encircling opposed brakeshoe tables in diametrically opposed relation having opposed portions to contact brake blocks to be bonded and opposed intermediate portions to bridge between said brake blocks, and
  b. reinforcing plate means laminated with said intermediate portions to extend between opposed brakeshoe tables and dimensioned to extend between the end of said brakeshoe struts wherein to strengthen said pressure band as it bridges the opposed brakeshoes and transmit tension throughout its width and the width of said band to insure consistent pressure on said brake blocks against the brakeshoe tables longitudinally and laterally.

10. A pressure band and spreader assembly as defined in claim 9 in which said intermediate portions of said band and said reinforcing plate means are perforated to provide clearance for the ends of spaced struts on brakeshoes.

11. A pressure band and assembly as defined in claim 9 in which laterally extending pressure blocks underlie said intermediate band portions and the respective ends of said reinforcing plate means at the end of said brakeshoes to distribute expansion pressure laterally and evenly across said bands and said plate means.

12. A device as defined in claim 11 in which means on said pressure blocks and means on struts of encircled brakeshoes interengage to position and retain said blocks under the pressure exerted by said band.

13. A device as defined in claim 12 in which brakeshoes within said band have pressure ends in the form of spaced struts extending along the shoe, said pressure ends having flat angled edges on the outside thereof, said pressure block having slots terminating in flat surfaces to interengage with said edges, and means transfixing said blocks and said struts to lock said blocks in place in said interengagement.

14. In a pressure band and spreader assembly for use in heat bonding brake blocks for large vehicle brakes having a nonuniform thickness under pressures ranging from 200 to 300 pounds per square inch, a portable spreader element for use in said assembly comprising:
  a. a pair of parallel pressure plates each having an arcuate edge to fit and bear against the inside surface of a brakeshoe table outside the struts on said table,
  b. a pair of spacer plates secured to and extending between said pressure plates to space said pressure plates in parallel relation, said spacer plates each having an outer edge to face said table slotted to provide clearance for brakeshoe struts, and having an inner edge facing away from said arcuate edges to serve as a load-bearing edge,
  c. leaf-spring means spanning and overlying said load-bearing edges,
  d. means for loosely confining said leaf-spring means against said load-bearing edges, and
  e. means secured to said leaf-spring means extending generally diametrically of said arcuate edges to cooperate with another spreader element to maintain a selected relative position within a pressure band.

15. In combination with opposed pairs of portable spreader elements as defined in claim 14, a pair of spaced upright expander units to bear against said leaf-spring means for exerting separating pressure to apply band pressure on brakeshoes, said expander units being slotted laterally from one side to permit said diametrically extending means to slide into position for application of separating force.

* * * * *